United States Patent
Bush et al.

(10) Patent No.: US 6,572,736 B2
(45) Date of Patent: Jun. 3, 2003

(54) NON-WOVEN WEB MADE WITH UNTREATED CLARIFIER SLUDGE

(75) Inventors: Philip Bush, Laurel, MS (US); Ricky Burkeen, Collinsville, MS (US); Robert H. Blanpied, Meridian, MS (US)

(73) Assignee: Atlas Roofing Corporation, Meridian, MS (US)

( * ) Notice: Subject to any disclaimer, the term of this patent is extended or adjusted under 35 U.S.C. 154(b) by 0 days.

(21) Appl. No.: 09/971,772

(22) Filed: Oct. 9, 2001

(65) Prior Publication Data

US 2002/0062934 A1 May 30, 2002

Related U.S. Application Data

(60) Provisional application No. 60/238,420, filed on Oct. 10, 2000.

(51) Int. Cl.[7] ............................................ D21H 17/01
(52) U.S. Cl. .................. 162/189; 162/125; 162/127; 428/304.4; 428/311.5; 428/311.7; 428/311.9; 428/314.4; 428/318.4
(58) Field of Search .................. 162/101, 123, 162/125, 127, 189; 428/304.4, 71, 311.5, 311.7, 311.9, 314.4, 318.4

(56) References Cited

U.S. PATENT DOCUMENTS

| | | | |
|---|---|---|---|
| 3,615,795 A | 10/1971 | Schulwitz et al. | |
| 3,630,830 A | 12/1971 | Herdle et al. | |
| 3,755,070 A | 8/1973 | Bey et al. | |
| 3,755,071 A | 8/1973 | Bey et al. | |
| 3,769,116 A * | 10/1973 | Champeau | 162/189 |
| 3,772,143 A | 11/1973 | Roth | |
| 3,773,513 A | 11/1973 | MacClaren | |
| 3,821,069 A | 6/1974 | Wurzburg | |
| 3,853,609 A | 12/1974 | Allen, Jr. et al. | |
| 3,884,755 A * | 5/1975 | Frost, III | 162/DIG. 9 |
| 3,885,962 A | 5/1975 | MacClaren | |
| 3,895,997 A * | 7/1975 | Haywood | 162/189 |
| 3,899,389 A | 8/1975 | Vaughn et al. | |
| 3,900,335 A | 8/1975 | Beck | |
| 3,906,142 A | 9/1975 | Dowthwaite et al. | |
| 3,923,745 A | 12/1975 | Dumas | |
| 3,957,574 A | 5/1976 | Anderson | |
| 3,990,939 A | 11/1976 | Aldrich et al. | |
| 4,029,885 A | 6/1977 | Buikema | |
| 4,040,900 A | 8/1977 | Mazzarella et al. | |

(List continued on next page.)

FOREIGN PATENT DOCUMENTS

| | | |
|---|---|---|
| CA | 2051997 | 3/1993 |
| EP | 0 186 956 A2 | 7/1986 |
| GB | 1 275 042 | 5/1972 |
| GB | 2 242 445 A | 10/1991 |
| WO | 94/27924 A2 | 12/1994 |

OTHER PUBLICATIONS

U.S. patent application, Ser. No. 09/425,051, filed Oct. 22, 1999, entitled "Dimensionally Stable Nonwoven Web Having Unique Method of Coloring".

*Primary Examiner*—Peter Chin
(74) *Attorney, Agent, or Firm*—Nixon & Vanderhye, B.C.

(57) ABSTRACT

The non-woven web of the present invention is comprised of recycled cellulose fiber and untreated Clarifier Sludge, and optionally, recycled glass fiber. Unlike uses of reclaimed Clarifier Sludge whereby the material has been treated in some fashion to improve its quality, the non-woven web of the present invention utilizes untreated Clarifier Sludge. The Clarifier Sludge of the present invention is dry enough to handle, and in one example varies between about 30% and about 45% solids. The Clarifier Sludge can be added to web-forming equipment (e.g., papermaking equipment) either in a waste paper disintegrator or into a recycling apparatus (e.g., broke pulper) whose output is metered into a refiner tank of the web-forming equipment. In an embodiment utilizing a broke pulper for introduction of the Clarifier Sludge, the broke pulper is filled with clarifier sludge and water to a consistency of about 3.5% solids.

49 Claims, 3 Drawing Sheets

U.S. PATENT DOCUMENTS

| | | |
|---|---|---|
| 4,065,349 A | 12/1977 | Bateman et al. |
| 4,141,750 A | 2/1979 | Emerson et al. |
| 4,174,415 A | 11/1979 | Bethe |
| 4,188,355 A | 2/1980 | Graham et al. |
| 4,207,142 A | 6/1980 | Shepherd |
| 4,222,820 A | 9/1980 | Hiskens et al. |
| 4,240,935 A | 12/1980 | Dumus |
| 4,245,689 A | 1/1981 | Grard et al. |
| 4,269,657 A | 5/1981 | Gomez et al. |
| 4,274,916 A | 6/1981 | Grose |
| 4,295,930 A | 10/1981 | Aitken et al. |
| 4,333,795 A | 6/1982 | Street |
| 4,373,992 A | 2/1983 | Bondoc |
| 4,381,367 A | 4/1983 | von Bonin et al. |
| 4,421,599 A | 12/1983 | Kuzuoka et al. |
| 4,422,879 A | 12/1983 | Poppel et al. |
| 4,426,470 A | 1/1984 | Wessling et al. |
| 4,437,894 A | 3/1984 | Emerson, Sr. |
| 4,445,972 A | 5/1984 | Bartelloni |
| 4,457,785 A | 7/1984 | Hsu et al. |
| 4,472,243 A | 9/1984 | Bondoc et al. |
| 4,481,075 A | 11/1984 | Dailly et al. |
| 4,483,744 A | 11/1984 | Emerson, Sr. |
| 4,505,778 A | 3/1985 | Robertson |
| 4,510,019 A | 4/1985 | Bartelloni |
| 4,513,045 A | 4/1985 | Bondoc et al. |
| 4,514,229 A | 4/1985 | Sato et al. |
| 4,517,052 A | 5/1985 | Choy |
| 4,536,447 A | 8/1985 | Hsu |
| 4,543,158 A | 9/1985 | Bondoc et al. |
| 4,545,854 A | 10/1985 | Gomez et al. |
| 4,547,265 A | 10/1985 | Forgione et al. |
| 4,551,200 A | 11/1985 | Cash |
| 4,551,201 A | 11/1985 | Cash |
| 4,576,680 A | 3/1986 | Kawatani et al. |
| 4,591,412 A | 5/1986 | Hechler |
| 4,606,773 A | 8/1986 | Novak |
| 4,609,431 A | 9/1986 | Grose et al. |
| 4,616,061 A | 10/1986 | Henning et al. |
| 4,618,401 A | 10/1986 | Bodendorf |
| 4,626,289 A | 12/1986 | Hsu |
| 4,657,946 A | 4/1987 | Rende et al. |
| 4,670,100 A | 6/1987 | Henning et al. |
| 4,680,223 A | 7/1987 | Bither |
| 4,681,658 A | 7/1987 | Hsu et al. |
| 4,749,444 A | 6/1988 | Lorz et al. |
| 4,789,430 A | 12/1988 | Fredenucci |
| 4,839,415 A | 6/1989 | Schürmann et al. |
| 4,956,049 A | 9/1990 | Bernheim et al. |
| 4,964,954 A | 10/1990 | Johansson |
| 4,969,975 A | 11/1990 | Biggs et al. |
| 5,114,538 A | 5/1992 | Malatesta |
| 5,116,924 A | 5/1992 | Bung et al. |
| 5,145,522 A | 9/1992 | Nakagawa et al. |
| 5,190,584 A | 3/1993 | Ruffini |
| 5,192,363 A | 3/1993 | Bussell et al. |
| 5,236,757 A | 8/1993 | Probst et al. |
| 5,236,778 A | 8/1993 | Landis et al. |
| 5,246,491 A | 9/1993 | Takahashi et al. |
| 5,252,625 A | 10/1993 | McLaughlin et al. |
| 5,254,600 A | 10/1993 | Blanpied et al. |
| 5,264,257 A | 11/1993 | Martinez et al. |
| 5,266,165 A | 11/1993 | DeClercq et al. |
| 5,290,849 A | 3/1994 | Lee |
| 5,294,647 A | 3/1994 | Blanpied et al. |
| 5,308,441 A | 5/1994 | Kern |
| 5,314,721 A | 5/1994 | Müller et al. |
| 5,320,712 A | 6/1994 | Sawayama et al. |
| 5,393,337 A | 2/1995 | Nakamura et al. |
| 5,393,379 A | 2/1995 | Parrinello |
| 5,407,537 A | 4/1995 | Malatesta et al. |
| 5,409,574 A | 4/1995 | Razac et al. |
| 5,438,087 A | 8/1995 | Ikeda et al. |
| 5,498,648 A | 3/1996 | de Clercq et al. |
| 5,501,771 A | 3/1996 | Bourson |
| 5,501,774 A | 3/1996 | Burke |
| 5,536,370 A | 7/1996 | Scherr et al. |
| 5,709,776 A | 1/1998 | Coleman et al. |
| 5,759,249 A | 6/1998 | Wasser |
| 5,876,562 A | 3/1999 | Johansson |
| 5,954,921 A | 9/1999 | Dahmen et al. |
| 5,961,708 A | 10/1999 | Zetter et al. |
| 5,969,011 A | 10/1999 | Frölich et al. |
| 5,972,094 A | 10/1999 | Bates et al. |
| 6,001,166 A | 12/1999 | Ettl et al. |
| 6,042,691 A | 3/2000 | Nitzman et al. |
| 6,087,457 A | 7/2000 | Tsai |
| 6,093,217 A | 7/2000 | Frölich et al. |

\* cited by examiner

NON-WOVEN WEB MADE WITH UNTREATED CLARIFIER SLUDGE This application claims the priority and benefit of U.S. Provisional Patent Application Ser. No. 60/238,420, filed Oct. 10, 2000, which is incorporated by reference herein in its entirety.

BACKGROUND

1. Field of the Invention

The present invention pertains to low cost moisture resistant and dimensionally stable non-woven continuous webs, and the use of inexpensive furnish for producing such webs.

2. Related Art and Other Considerations

Non-woven continuous web materials have been known in the art at least since the 19$^{th}$ Century, when the English papermaking brothers Sealy and Henry Fourdrinier started their first machine. Over the years many fibers have been used to make various types of webs, including asbestos, bagasse, cotton, glass, hemp, jute, kenaf, sisal, various types of wood cellulose pulp, and many forms of synthetic plastic fibers. For example, U.S. Pat. Nos. 3,773,513 and 3,885,962 to MacClaren teach the use of glass fiber and latex to stabilize a photographic paper.

When health concerns made asbestos fiber obsolete, web makers turned to glass fibers and synthetic fibers made of various plastics. For example, common vinyl floor backing webs which had been made with asbestos fibers were subsequently made of a combination of glass and plastic fibers using a polymer latex as a binder. U.S. Pat. No. 4,274,916 and U.S. Pat. No. 4,373,992 both disclose a dimensionally stable backing web using polypropylene fibers for stabilization. U.S. Pat. No. 4,373,992 further teaches the adding of glass fibers. U.S. Pat. No. 4,269,657 pertains to an asbestos-free web that uses slightly refined virgin cellulose fiber incorporating a low percentage of glass fiber.

The art of "sizing" non-woven webs is nearly as old as the continuous formation mode. For the purpose of defining "sizing," see simultaneously-filed U.S. patent application Ser. No. 09/971,771 and U.S. Provisional Patent application No. 60/238,457, both entitled "NON-WOVEN WEB HAVING UNIQUE LIQUID RESISTANCE AND DIMENSIONAL STABILITY", which are incorporated herein by reference in their entirety. Products using the materials of the present invention can be either sized, or not sized. The current invention pertains to types of fiber utilized rather than any form of sizing against moisture resistance.

A sampling of prior art directed toward various different types of fibers used in non-woven webs can be found in the following list of U.S. patents, all of which are incorporated herein by reference:

| | | | |
|---|---|---|---|
| 3,773,513 | 3,885,962 | 4,174,415 | 4,188,355 |
| 4,245,689 | 4,269,657 | 4,274,916 | 4,373,992 |
| 4,426,470 | 4,445,972 | 4,457,785 | 4,472,243 |
| 4,481,075 | 4,510,019 | 4,513,045 | 4,536,447 |
| 4,543,158 | 4,545,854 | 4,591,412 | 4,609,431 |
| 4,618,401 | 4,626,289 | 4,680,223 | 4,681,658 |
| 4,749,444 | 4,789,430 | 4,956,049 | 4,964,954 |
| 4,969,975 | 5,236,757 | 5,236,778 | 5,393,379 |
| 5,409,574 | 5,501,771 | 5,501,774 | 5,536,370 |

An ordinary 100% cellulose non-woven continuous web material known as "felt" has been used for many years in the production of asphalt saturated roofing felt. This material is used to cover and protect the plywood or composition board comprising the structural part of a sloped roof prior to adding exterior protection. Sloped roof construction is normally used on residential buildings, churches, and schools. The exterior covering over the saturated asphalt felt can be shingles, tiles, slate, or newer materials such as standing ridge steel panels. The layer of asphalt saturated cellulose felt between the structural deck and exterior membrane is often called "underlayment."

A particular glass fiber reinforced non-woven continuous web material has been used for many years in the production of polyisocyanurate (polyiso) foam board insulation. This rigid plastic foam insulation board has become the most popular type of commercial roofing insulation. It is manufactured by pouring liquid chemical streams on the continuously moving bottom felt, known as the bottom "Facer," with a second Facer being placed on top of the foaming streams. The polyiso foaming liquid is deposited between two webs of the Facer felt, cured into a unified foamed board, and then cut into insulation board lengths. The largest producer of this facer felt, Atlas Roofing Corporation, developed a glass fiber-utilizing facer which Atlas refers to as "Glass Reinforced Felt" (GRF) Facer. Certain aspects of this facer product are disclosed in U.S. patent application, Ser. No. 09/425,051, which is incorporated herein by reference in its entirety. The GRF Facer has a higher degree of dimensional stability than 100% cellulose felt. As an integral part of an insulation board, GRF Facer adds strength and durability to a lightweight insulation board that is used in a severe environment. Strength and durability are important because commercial roofing products suffer some of the most intense punishment experienced by building construction products.

Historically, asphalt saturated roofing felt and GRF Facers have primarily used recycled waste paper as the raw material source for fiber. In most cases, OCC (Old Corrugated Container) is the main source of fiber. OCC is normally the highest cost material used in a paper mill that uses nothing but recycled waste paper. Mixed waste, or office waste, or newsprint, or wood flour, or some mixture of these has been the lower cost fiber source to augment the OCC. The successful use of recycled glass fiber has improved the properties of the facer web while keeping the cost reasonable. The cost of either virgin glass fiber or virgin cellulose fiber is much too high for this facer.

For the purpose of describing this invention, the term "Clarifier Sludge" refers to the rejected solids that are separated from the post-processing water by the cleaning and recycling systems in paper and pulp mills. Thus, "Clarifier Sludge" encompasses but is not limited to the mixture of short fibers, extremely large fibers, and inorganic contaminates that are separated from the recycling water of a pulp and/or paper mill. Clarifer Sludge is sometimes sent to an approved landfill. Most of it is burned as boiler fuel after some water has been removed. Several solid/liquid separation systems in use have trade names, but herein they are collectively and generically called "clarifiers." Both pulp mills and paper mills have a need to clean their post-processing water, especially if it is an effluent going back into the public sewer or watershed systems. Untreated Clarifier Sludge is notoriously unacceptable as a paper mill furnish.

Thus, the owner of the pulp and/or paper mills primarily direct their efforts to the clarification of the water, rather than emphasizing the collection of solids (e.g., Clarifier Sludge). The collection of solids is an onerous but necessary part of the cleaning of pulp and paper mill effluent water. Disposal of Clarifier Sludge is often hampered by environmental concerns. The quality of the fiber found in this recovered solids mass will depend upon the source of the fiber used by the paper mill. If a pulp mill is integrated with a paper mill, these recycling water streams are usually mixed prior to clarifier treatment. In this case, the fiber quality of these mixed streams will be higher than most any other situation. The reason is that some of this fiber has never been through a refiner. Even the relatively high quality Clarifier Sludge from a de-inking plant will have no unrefined fibers. The highest quality sludge is found where a pulp mill treats their own recycling water, separate from a paper mill.

Many attempts have been made at improving wet Clarifier Sludge to a state of being useful. At least by the mid-1970s a company developed a system for recovery of fiber from paper mill effluent. U.S. Pat. No. 3,833,468 to Boniface teaches such a system. Other U.S. patents concentrating on either the apparatus to improve, or the method of improving, waste Clarifier Sludge include the following:

| | | | |
|---|---|---|---|
| 4,983,258 | 5,002,633 | 5,137,599 | 5,297,742 |
| 5,332,474 | 5,423,993 | 5,527,432 | 5,536,371 |
| 5,772,847 | | | |

The various processes to improve quality of Clarifier Sludge are relatively expensive, raising the cost of acceptable fiber furnish. In some instances, the freight costs to transport this type of reclaimed fiber are prohibitive. Excessive freight costs can be due to the large percentage of water usually found in this material, or the distance from the source to the paper mill using the material, or both.

The quality of untreated Clarifier Sludge has been so low that it has not been considered suitable as a substitute for waste paper. Only after being treated by one or more of the various schemes noted above has it been useful. One example, U.S. Pat. No. 5,423,993, teaches a method using a fiber recovery system inside a paper mill. It appears that no paper mill has heretofore successfully used untreated Clarifier Sludge.

The quality of waste paper is lower now than at any time in the past, primarily due to more recycling. Some experts estimate that any given Kraft fiber originally used in a cardboard box can be reused at least five different times in five different waste paper mills. Another major reason waste paper quality has dropped is that the suppliers allow more contamination from metals and plastics. A further problem is the large increase in coated papers being recycled. Coated paper means high levels of mineral pigments as ash. Wide fluctuations in the amount of coated paper in "Mixed Waste" causes a loss of control over the percent ash in felt. The lack of consistent properties causes endless problems for a paper mill using 100% recycled waste paper. Any given truckload of any grade of waste paper will contain significantly different materials than any other truckload of the supposedly same grade. In today's market, it is virtually impossible to purchase consistent properties in any grade of waste paper. This makes it difficult to manufacture a web of felt, with or without glass fibers, with uniform properties.

Thus, there remains a need for a more consistent source of secondary cellulose fibers to make dry felt both for asphalt saturated underlayment and for facers (e.g., glass reinforced felt facers) for polyiso foam boards. Therefore it is an object of the present invention to provide an economical dry felt having more consistent properties by utilizing a more uniform source of cellulose fiber.

BRIEF SUMMARY OF THE INVENTION

The non-woven web of the present invention is comprised of recycled cellulose fiber and untreated Clarifier Sludge, and optionally, recycled glass fiber. Unlike uses of reclaimed Clarifier Sludge whereby the material has been treated in some fashion to improve its quality, the non-woven web of the present invention utilizes untreated Clarifier Sludge.

The Clarifier Sludge used in the present invention is dry enough to handle, e.g., with a front-loader, and in one example varies between about 30% and about 45% solids. The Clarifier Sludge can be added to web-forming equipment (e.g., papermaking equipment) either in a waste paper disintegrator or into a recycling apparatus (e.g., broke pulper) whose output is metered into a refiner tank of the web-forming equipment. In an embodiment utilizing a broke pulper for introduction of the Clarifier Sludge, a broke pulper is filled with Clarifier Sludge and water to a consistency of about 3.5% solids. In a practical example, over fifty percent (50%) of the total paper making furnish (i.e., paper making solids) is Clarifier Sludge.

The use of the Clarifier Sludge of the present invention for papermaking involves selection of proper retention and drainage agents. In particular, the retention and drainage agents must enable solids (e.g., the impurities) of the Clarifier Sludge to stay in a sheet formed in the papermaking machine and still permit good liquid drainage. Proper agent selection enables a bundling of the short fibers and the impurities of the Clarifier Sludge with the longer fibers in the wastepaper, and at the same time permits quick liquid drainage between the forming bundles; e.g., "pin-flocs".

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION

Figure 1:
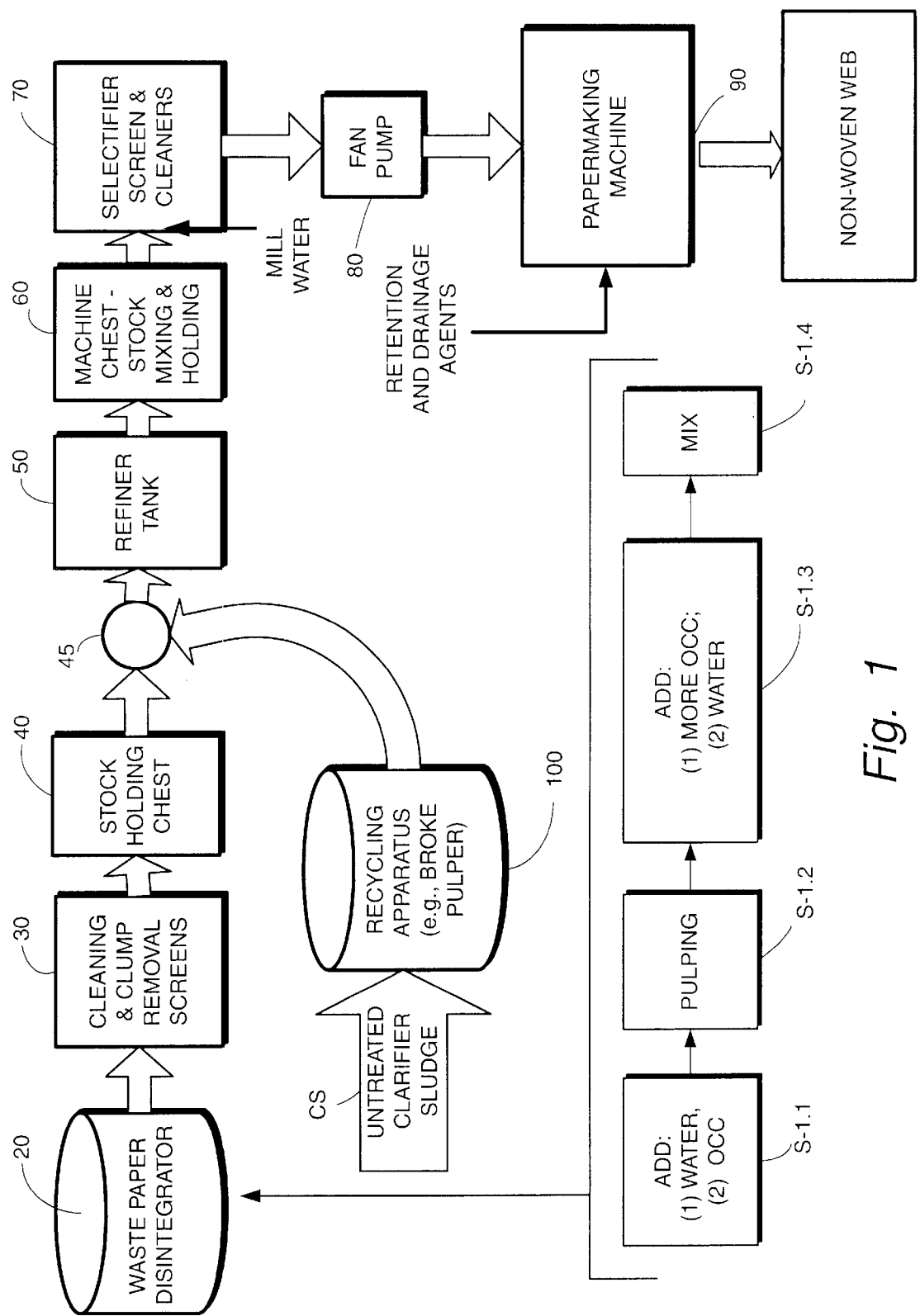
FIG. 1 is a schematic view showing apparatus and process steps for producing a non-woven continuous web, specifically "Dry Felt", in accordance with a first Example of an embodiment of the present invention.

In the following description, for purposes of explanation and not limitation, specific details are set forth such as particular compositions, processes, techniques, etc. in order to provide a thorough understanding of the present invention. However, it will be apparent to those skilled in the art that the present invention may be practiced in other embodiments that depart from these specific details. In other instances, detailed descriptions of well-known ingredients, steps, or operations are omitted so as not to obscure the description of the present invention with unnecessary detail.

As used in this invention, the term "recycled cellulose fiber" means either (1) post-consumer recycled waste paper and cardboard, or (2) pre-consumer but post-industrial recycled waste paper and cardboard, which is obtained from factories, or a combination of (1) and (2). An example of pre-consumer but post-industrial recycled waste paper and cardboard is the side-trim and clippings that come from paper converters. Post-consumer paper and cardboard is the largest source available.

For the purpose of describing this invention, the term "recycled glass fiber" is exemplified by the synthetic binderimpregnated waste material not usable by the producers of glass-fiber mats. Due to the synthetic binders that are added during the formation of glass mats, only a limited amount of waste glass mat can be recycled within the mat-forming process. Too much recycled binder interferes with the acceptable formation of glass fibers on a forming wire. Owing to the high expense of cleaning the binder from mat trimmings, or rejected mat, this material has instead been sent to landfill sites. But by selling this scrap glass mat and trimmings (e.g., recycled glass fiber) to GRF Facer manufacturers for facer production in accordance with the techniques of the present invention, the glass mat producers can avoid the added cost of paying for landfill. Moreover, the GRF Facer producer enjoys lower costs for glass fiber.

In general, there are two drawbacks to using recycled glass fiber. A first drawback is that, after the recycled glass fiber has been subjected to the intense mechanical energy needed to break up the mat (especially if the mat is in the form of a roll), most of the fibers are shorter than any virgin fibers commercially available. A second drawback is that, due to the much shorter fiber lengths, the first-pass retention is lower than if virgin fiber had been used. However, recycled glass fiber lengths in glass reinforced felt facers can range from less than 1-mm up to over 13-mm, due to the wide range of recycled glass fibers employed and the varied conditions found in preparing the glass fibers for use.

The non-woven web of the present invention is comprised of recycled cellulose fiber and untreated Clarifier Sludge, and optionally, recycled glass fiber. Unlike uses of reclaimed Clarifier Sludge whereby the material has been treated in some fashion to improve its quality, the non-woven web of the present invention utilizes untreated Clarifier Sludge. That is, prior to its introduction into the apparatus of the present invention, the Clarifier Sludge has not been treated with fiber cleaning or reclamation equipment.

The Clarifier Sludge utilized in the present invention is preferably dry enough to handle, e.g., with a front-loader, and in one example varies between about 30% and about 45% solids. The Clarifier Sludge can be added to web-forming equipment (e.g., papermaking equipment) either in a waste paper disintegrator or into a recycling apparatus (e.g., broke pulper) whose output is metered into a refiner tank of the web-forming equipment. In an embodiment utilizing a broke pulper for introduction of the Clarifier Sludge, the Broke Pulper is filled with Clarifier Sludge and water to a consistency of about 3.5% solids. In the present invention, a practical example (see EXAMPLE 1 below) uses over fifty percent (50%) of the total paper making furnish (i.e., paper making solids) as Clarifier Sludge.

The non-woven web also comprises chemical additives to enhance paper machine processing; and, optionally, to enhance final web performance. The preferred embodiments can more easily be described using the following examples shown below.

EXAMPLE 1

Basic structure and certain process steps involved in Example 1 are illustrated in FIG. 1, which shows the papermaking system of the present invention. The papermaking system includes a waste paper disintegrator 20; cleaning & clump removal screens 30; stock holding chest 40; refiner tank 50; machine chest (for stock mixing and holding) 60; selectifier screen and cleaners 70; fan pump 80; and papermaking machine 90.

Process steps performed in waste paper disintegrator 20 are labeled as steps/blocks S-1.1 through S-1.4 in FIG. 1. As step S-1.1, the disintegrator 20, being a large type waste paper disintegrator as used by any waste-paper mill (such as a Hydrapulper® type waste paper disintegrator, for example), is charged with about 5000 gallons of water, to which is added about 1800 pounds of OCC (Old Corrugated Container). The water/OCC mixture is pulped (step S-1.2) until the big clumps are disintegrated. To the pulped mixture is added (as step S-1.3) another 1200 pounds of OCC and another 5000 gallons of water. The resulting stock is now at about 3.5% consistency (% solids). As soon as this blend is well mixed (step S-1.4), it is passed through cleaning and clump removal screens 30.

As a routine practice, in a parallel operation, items such as side trim, deckle edge, reject rolls, and other paper machine waste are recycled using recycling apparatus 100. Typically paper machines have such a recycling apparatus (such as a broke pulper of one type or another, or beater) to recycle in-house fibers that are too dry to pump. The recycle material from recycling apparatus 100 is added to the stock furnish coming from waste paper disintegrator 20 in refiner tank 50.

In Example 1 of the present invention, and as a radical departure from the prior art practice, untreated Clarifier Sludge (represented by arrow "CS" in FIG. 1) is introduced into the recycling apparatus 100, which in the illustrated embodiment is a Broke Pulper. Prior to this point, the Clarifier Sludge has not been treated with fiber cleaning or reclamation equipment, and thus includes as its solids impurities such as one or more of plastic, wood particles, sand, ash, and grit, for example. The Clarifier Sludge of this example varies between about 30% and about 45% solids; e.g., dry enough to handle with a front-loader. It is a most preferred method within the teaching of this invention to primarily use the Broke Pulper 100 as the place to add incoming Clarifier Sludge which has not been specially treated or cleaned. However, if the Waste Paper Disintegrator 20 is easily accessible, this location is another point at which the Clarifier Sludge can be added in another mode of the invention.

The Broke Pulper 100 is filled with Clarifier Sludge and water to a consistency of about 3.5% solids, whereupon it is pumped to a metering device 45 situated immediately above the refiner tank 50. This metering device 45, in one embodiment, is or has simple double weir-gates with return and flow-ahead ports. This metering device 45 is used to regulate the amount of Clarifier Sludge being added to the OCC system. The output of Broke Pulper 100 is metered at about 55%. The OCC stock from disintegrator 20 is metered at about 45%. The outputs from Broke Pulper 100 and disintegrator 20 are thus combined and well mixed in refiner tank 50 prior to passing through refiner 55, and afterwards mixed well in machine chest 60.

After stock dilution with mill water, various processing aids such as retention aids, drainage aids, and defoamers are added as needed in paper making machine 90. The use of the Clarifier Sludge of the present invention for papermaking involves selection of proper retention and drainage agents. In particular, the retention and drainage agents must enable solids (e.g., impurities) of the Clarifier Sludge to stay in a sheet formed in the papermaking machine 90 and still permit good liquid drainage. Proper agent selection enables a bundling of the short fibers and the solids (e.g., impurities) in the Clarifier Sludge with the longer fibers in the OCC and other wastepaper, and at the same time permits quick liquid drainage between the forming bundles; e.g., "pin-flocs".

One example of such appropriate agents involves utilizing an acrylamide modified cationic copolymer such as Nalco 7520 at about two pounds (2.0-lbs. as-received liquid basis) per ton of paper in conjunction with about one (1) pound (dry basis per ton) of a strongly anionic amorphous silica such as Nalco 8692. In accordance with such example, the first pass retention can be maintained above 90%, plus providing an increase in drainage rate. Not many years ago it was impossible to obtain a first-pass retention of over ninety percent (90%) of any type of incoming stock retained on a 14-mesh wire cylinder. Faster drainage plus higher percent retention is made possible by creating pin-flocs in the low consistency (below 0.80% solids) vat stock. Even though proper retention and drainage agents such as those mentioned above have been commercially available, heretofore the greatly disfavored Clarifier Sludge has not been successfully utilized in papermaking in view of its perceived contamination issues.

In paper making machine 90, the sheet formed is pressed by a standard mechanical paper wet-press section before introducing the web to a typical steam-heated dryer section.

Because enough material is available, it has been discovered that the quality requirements of Dry Felt are not compromised by using over 50% of the total paper making furnish (i.e., paper making solid constituents) as Clarifier Sludge. However, not enough material is available to determine how much Clarifier Sludge can be used without hurting desired properties. Of course, any minimum amount helps the cost.

With regard to Tables 1, 2, and 3, all the tests are familiar to all persons skilled in the art of papermaking and/or are understood in the context of the present disclosure. In this regard, the Solvent of the Penetration Test is comprised of Stepan polyol S-2352 at 100-parts-by-weight (pbw) mixed with 30-pbw HCFC-141b. The polyol is obtained from Stepan Company, Northfield, Ill. 60093, and HCFC-141b can be obtained from Atochem or Aldrich. The Test is made by holding an elevated 12-inch square sample horizontal, dropping 10-grams of Solvent in the center, and recording the seconds required for the first small circle of "show-through" to appear. These test results represent the Quality Control Tests made within 24 hours of production.

The single cylinder vat machine web produced by Example 1 is usually called "Dry Felt", which is used to make asphalt saturated roofing felt. This type of felt must be able to pick up (absorb) at least its own weight in asphalt. If a Dry Felt absorbs asphalt in exactly the same weight as the felt, it is said to "Pick Up 100%." The Dry Felt of Example 1 exhibits the test characteristics shown in Table 1.

TABLE 1

| CHARACTERISTIC/TEST | MEASUREMENT |
| --- | --- |
| Basis Weight | 25-pounds per 480-ft$^2$ |
| Tensile Test, M.D. | 32-pounds per linear inch (1-inch by 8-inch test strip) |
| Percent Asphalt Saturation | 105% pick-up by weight |

The test results for the web of Example 1 are essentially as good as those of the prior art, and yet advantageously the felt of Example 1 is more economical to produce. Furthermore, personnel operating paper machines which use 100% recycled waste paper but not the untreated Clarifier Sludge of the present invention spend more time making adjustments. With enough volume, it may be possible to eliminate one person from a papermaking machine crew when using Clarifier Sludge.

EXAMPLE 2

Figure 2:
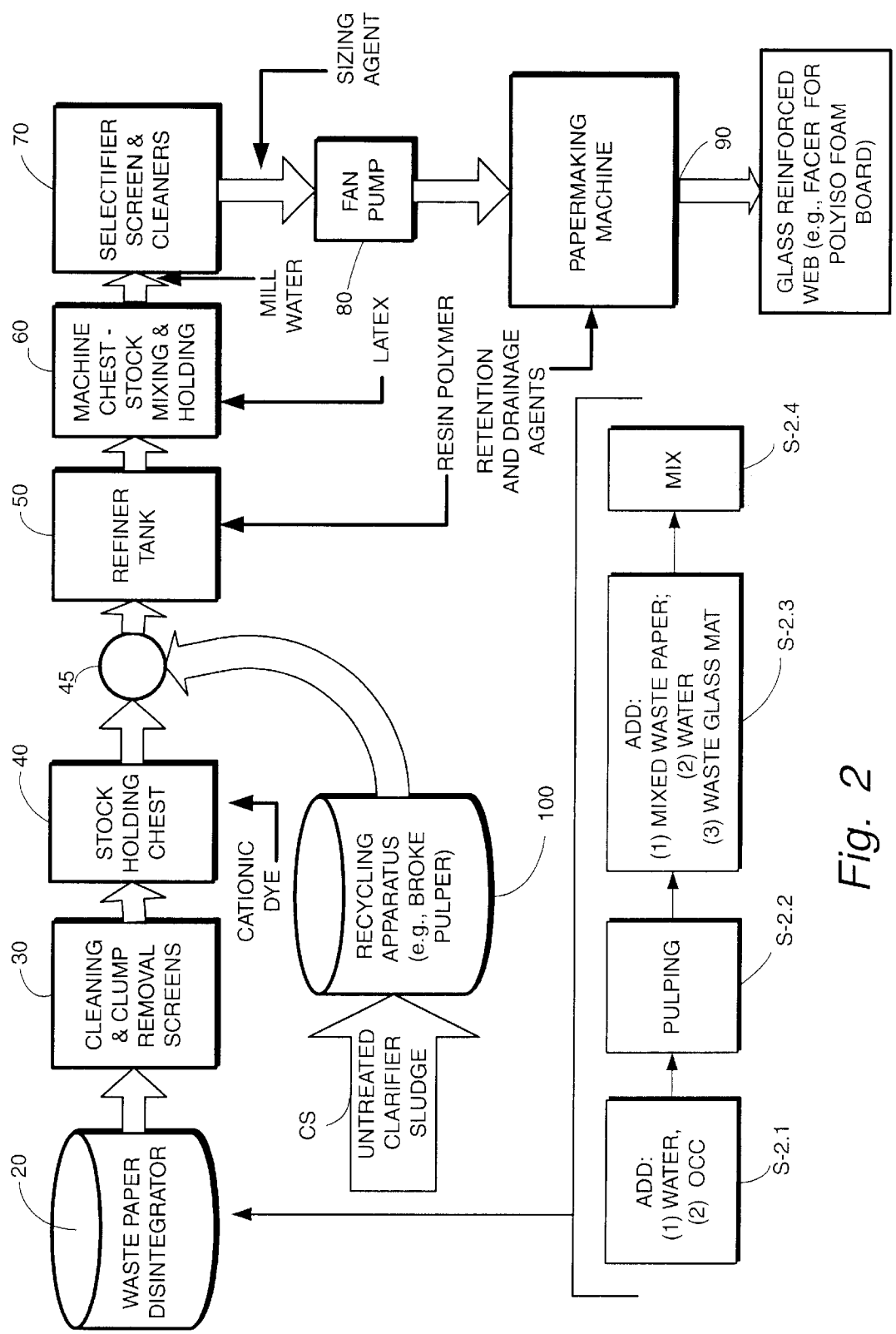
FIG. 2 is a schematic view showing apparatus and process steps for producing a non-woven continuous glass reinforced web (e.g., facer) in accordance with a Second Example of an embodiment of the present invention.

Example 2 shows a method of making a glass reinforced felt facer for polyiso foam boards in accordance with a mode of the present invention. The method of Example 2 is depicted in FIG. 2. As understood from the ensuing discussion, initial steps of the method of Example 2 resemble those of the method of Example 1 with it use of Clarifier Sludge, but additionally the facer of Example 2 includes recycled glass (e.g., waste glass mat).

As step S-1.1, at step S-2.1 a large type waste paper disintegrator 20 is charged with about 5000 gallons of water, to which is added about 1900 pounds of OCC (Old Corrugated Container). The water/OCC mixture is pulped (step S-2.2) until the big clumps are disintegrated. To the pulped mixture is added (as step S-2.3) about 650 pounds of Mixed Waste paper, another 5000 gallons of water, and 550 pounds of waste glass mat. The resulting stock is now at about 3.6% consistency (percent solids).

When the blend is well mixed (step S-2.4), it is passed through clump removal screens 30. As the stock enters the first stock chest 40, Basazol Black PR-376-L dye from BASF is added in an amount sufficient to obtain the desired shade of gray, usually about four (4) pounds of full strength dye per ton of glass reinforced felt facer.

In the papermaking industry, chemical addition rates are normally measured in the liquid form, but reported using dry weight basis of the chemical per ton, or 2000 pounds, of finished paper. As an example, following the dye addition comes the addition of cationic resin polymer, such as a polyamide wet-strength agent. The liquid polymer is pumped into the system at a rate which will provide 30 dry pounds per ton of finished paper. Instead of reporting this as an add-on rate of 30 dry pounds per ton, this rate can be expressed as an add-on rate of about 1.5% dry basis (d.b.). The polymer is added to the thick stock in refiner tank 50.

After passing through stock refiner 50, the stock is pumped to holding chest 60 where about 3.5% d.b. dispersed carboxylated SBR latex is added. All the active chemicals (e.g., the cationic dye, sizing agent(s), resin polymer and SBR latex) are pumped to their respective addition points as full strength liquids, but then mixed with a stream of mill water to greatly reduce the concentration. This dilution substantially aids in product distribution.

As in Example 1 of FIG. 1, Clarifier Sludge is introduced into the Broke Pulper 100. The Clarifier Sludge of this example varies between about 30% and about 45% solids. The Broke Pulper 100 is filled with Clarifier Sludge and water to a consistency of about 3.5% solids, whereupon, as in Example 1, it is pumped to a metering device 45 immediately above the Refiner Tank 50.

Then the stock is diluted somewhat before passing through a Selectifier® screen and several cleaners 70. A good quality glass reinforced felt facer requires substantial liquid resistance, and this is provided by a synthetic sizing agent being added. One preferred synthetic sizing agent is Alkenyl Succinic Anhydride, which is added at the rate of about 0.2% to about 0.4% dry basis weight [See simultaneously-filed U.S. patent application Serial No. 09/971,771 and U.S. Provisional Patent Application No. 60/23 8,457 , both entitled "NON-WOVEN WEB HAVING UNIQUE LIQUID RESISTANCE AND DIMENSIONAL STABILITY", which are incorporated herein by reference in their entirety.] Following this addition, another dilution is made at a fan-pump 80 to about 0.8% consistency. The stock is then introduced to the paper making machine 90. Paper making machine 90 can comprise any suitable apparatus, such as a Fourdrinier, a single cylinder, or multiple cylinder vat machines, for example. The retention and drainage agents of Example 1 are also utilized in papermaking machine 90 for Example 2.

The single cylinder vat machine web produced by Example 2 exhibits the test characteristics shown in Table 2. Again, if the percent Clarifier Sludge utilized is not excessive, there will be no loss of properties appearing. At worst, a 10% reduction in the tensile strength may be observed; however, that amount is not significant in this grade.

TABLE 2

| CHARACTERISTIC/TEST | MEASUREMENT |
| --- | --- |
| Basis Weight | 25-pounds per 480-ft$^2$ |
| Tensile Test, M.D. | 28-pounds per linear inch (1-inch by 8-inch test strip) |
| Ash Content | 17% |
| Organic Solvent Penetration Test | 14-seconds to 18 seconds to First Penetration |
| Two minute Cobb Test | 6.7% weight increase from water absorption |

EXAMPLE 3

Figure 3:
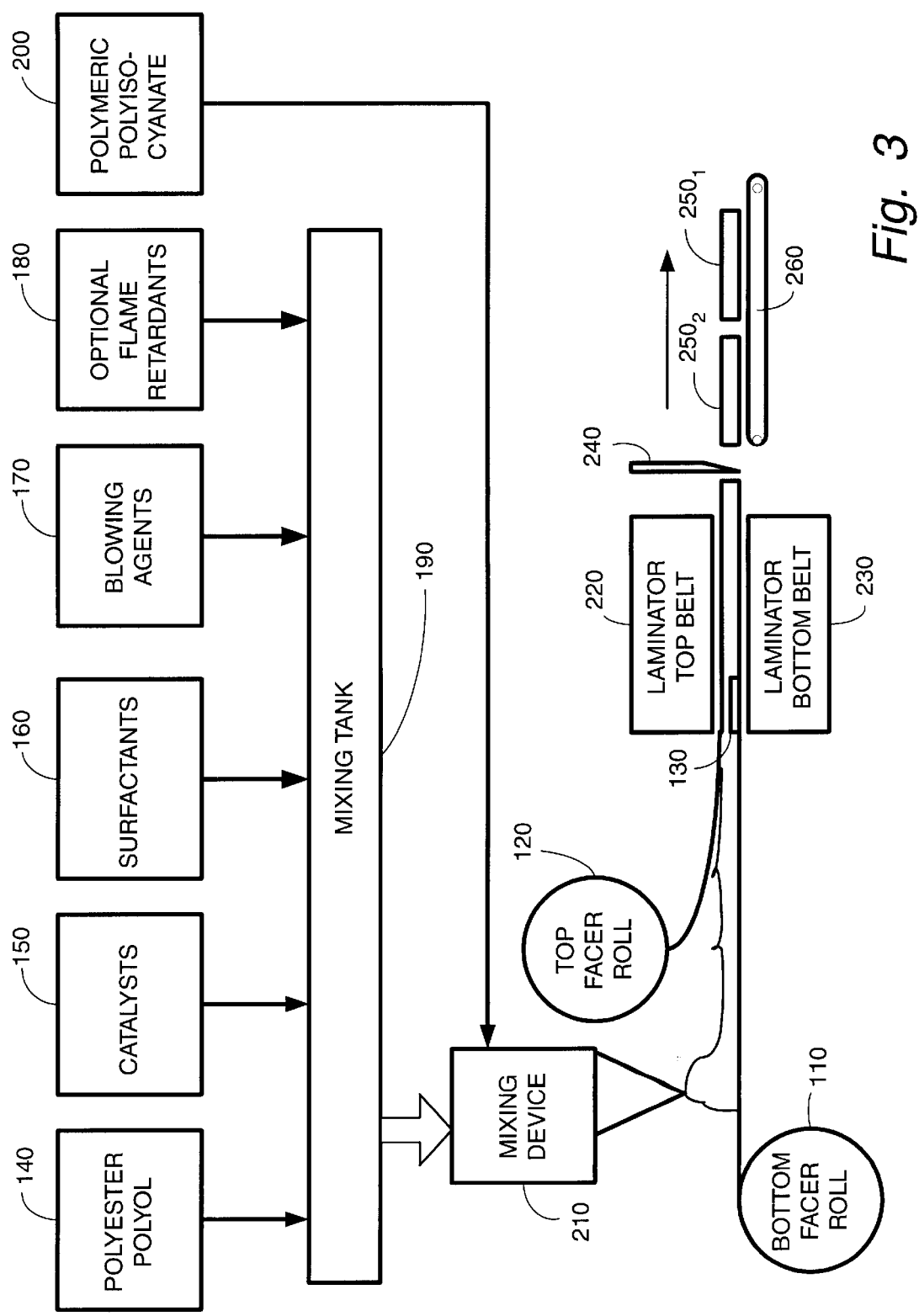
FIG. 3 is a schematic view showing apparatus and process steps for utilizing the glass reinforced non-woven continuous web (e.g., facer) of the Second Example in production of a polyisocyanurate foam board in accordance with a Third Example of the invention.

Also provided is a rigid cellular foam insulation board made with the lower cost web material (e.g., the glass reinforced felt facer of Example 2), and method of making the same. Such boards can be made on a typical continuous restrained-rise double steel belt foam board laminator, or on any other board producing machinery such as a continuous free-rise foam board machine. FIG. 3 shows a representative generic type restrained-rise laminator that can use facers of the present invention (e.g., the facers of Example 2). While FIG. 3 illustrates a generic type restrained-rise laminator, it should be kept in mind that a free-rise machine may be employed.

Basic structure and process steps involved in a foam board production are also illustrated in FIG. 3. Two (2) rolls 110 and 120 of GRF Facer of the invention are unwound and pulled into the laminator. On a free-rise machine, motor-driven pull-rolls grip the facers to provide the means to feed the machine, whereas on a restrained-rise machine, scrap boards 130 are used grip the two facers between the double belts 220, 230. Prior to the machine starting, the bulk polyol in storage tank 140 is mixed with other chemicals such as catalysts, surfactants, blowing agents, and (optionally) flame retardants. These additives are stored as shown in storage tanks 150, 160, 170, and 180 respectively. The above mentioned chemicals from storage tanks 150, 160, 170, and 180 are completely mixed in mixing tank 190. As the machinery is started the polymeric polyisocyanate in storage tank 200 is pumped to the mixing device 210 at the same instant that the mixed materials in mixing tank 190 are fed to the mixing device 210. At this point, all the chemicals needed have been mixed and are laid on the bottom facer before the top facer is lowered into place on top of the chemicals. These mixed chemicals begin to react and expand in preplanned rates (See U.S. Pat. No. 5,252,625; U.S. Pat. No. 5,254,600; and U.S. Pat. No. 5,294,647; all incorporated herein by reference in their entirety). As the liquid turns into foam it expands to fill the cavity between the top laminator belt 220 and the bottom laminator belt 230, both motorized parts of the machine. A solid board is created and viewed for quality at the end of the laminator. A crosscut saw 240 cuts the solid boards 250$_1$ and 250$_2$ into planned lengths, which are then carried away from the crosscut saw 240 by a motorized conveyor 260 that runs faster than the laminator belts 220 and 230. The rigid boards are stacked and wrapped, completing the process.

Thus, in accordance with the present invention, and as poor as Clarifier Sludge quality is, when used in a 100% recycled paper mill, there is no need to add special fiber recovery equipment.

Through the use, e.g., of modern flocculating and drainage polymers such as described above, inorganic contaminants and the large amount of extremely short fibers ("fines") included in the Clarifier Sludge can be held in the web, thereby keeping the recycled water relatively clean. As long as fines are not lost to the recycled water system, the effluent quality is not impaired. In some ways, the additional fines improve the characteristics of the felt product. Often times, the running speed of a paper machine will be slowed due to the slower water drainage caused by excessive fines. However, the running speed can be maintained as long as the fines are flocculated into small bundles of fiber, which do not slow drainage.

Advantageously, the quality requirements of GRF Facer are not compromised by using about 40% of the total paper making furnish (i.e., paper making solid constituents) as Clarifier Sludge; and, in making Dry Felt by using over about 50% as Clarifier Sludge.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The embodiments of the invention in which an exclusive property or privilege is claimed are defined as follows:

1. A method of manufacturing a non-woven web using a papermaking system, the method comprising:
    forming a web in the papermaking system using a mixture of recycled cellulose fiber and Clarifier Sludge, the Clarifier Sludge being introduced directly into the paper making system without the use of fiber cleaning or reclamation equipment;
    introducing into the papermaking system retention and drainage agents chosen to enable solids in the Clarifier Sludge to be included in a sheet forming in the papermaking system while permitting liquid drainage;
    wherein the Clarifier Sludge being introduced into the paper making system involves adding the Clarifier Sludge to a broke pulper.

2. The method of claim 1, further comprising forming the web additionally using recycled glass fiber.

3. The method of claim 1, wherein the Clarifier Sludge comprises between about 30% and about 45% solids.

4. The method of claim 1, further comprising adding the Clarifier Sludge to a broke pulper filled with clarifier sludge and water to a consistency of about 3.5% solids.

5. The method of claim 1, wherein the Clarifier Sludge comprises over about fifty percent (50%) of the solid material of the web.

6. A web produced by the method of claim 2.

7. A web produced by the method of claim 3.

8. A web produced by the method of claim 1.

9. A web produced by the method of claim 4.

10. A web produced by the method of claim 5.

11. A rigid cellular foam board comprising:
    a first facer and a second facer;
    a rigid cellular foam formed between the first facer and the second facer;
    wherein at least one of the first facer and the second facer comprise:
    recycled cellulose fiber;
    recycled glass fiber, and
    untreated Clarifier Sludge.

12. The foam board of claim 11, wherein the Clarifier Sludge comprises over about fifty percent (50%) of the solid material of the at least one of the first facer and the second facer.

13. A rigid cellular foam board comprising:
    a first facer and a second facer;
    a rigid cellular foam formed between the first facer and the second facer;
    wherein at least one of the first facer and the second facer comprise:

recycled cellulose fiber; and untreated Clarifier Sludge.

14. The foam board of claim 13, wherein the Clarifier Sludge comprises over about fifty percent (50%) of the solid material of the at least one of the first facer and the second facer.

15. A method of manufacturing a rigid cellular foam board comprising:

forming at least one of a first facer and a second facer using recycled cellulose fiber and untreated Clarifier Sludge;

depositing a mixture of foam-forming chemicals to form a rigid cellular foam between the first facer and the second facer.

16. The method of claim 15, further comprising forming least one of the first facer and the second facer using recycled glass fiber.

17. The method of claim 15, wherein the Clarifier Sludge comprises between about 30% and about 45% solids.

18. The method of claim 15, wherein the Clarifier Sludge comprises over about fifty percent (50%) of the solid material of the web.

19. The method of claim 15, further comprising using retention and drainage agents.

20. The method of claim 19, wherein the retention and drainage agents comprise acrylamide modified cationic copolymer.

21. The method of claim 19, wherein the retention and drainage agents comprise anionic amorphous silica.

22. A method of manufacturing a continuous non-woven web comprising:

(1) forming a mixture of cellulose fiber and Clarifier Sludge, prior to forming of the mixture the Clarifier Sludge not having been treated by fiber cleaning or reclamation equipment;

(2) introducing the mixture of cellulose fiber and Clarifier Sludge onto a wire screen of a papermaking system to form the continuous web;

(3) using retention and drainage agents chosen to achieve over ninety percent first pass retention of solids in the mixture on the wire screen while permitting liquid drainage.

23. The method of claim 22 further comprising in step (1) also forming the mixture to include recycled glass fiber.

24. The method of claim 22 wherein the Clarifier Sludge comprises between about 30% and about 45% solids.

25. The method of claim 22 further comprising adding the Clarifier Sludge to the paper making system in one of a waste paper disintegrator or a recycling apparatus.

26. The method of claim 22 further comprising adding the Clarifier Sludge to the paper making system to a broke pulper.

27. The method of claim 22 further comprising adding the Clarifier Sludge to a broke pulper filled with clarifier sludge and water to a consistency of about 3.5% solids.

28. The method of claim 22 wherein the Clarifier Sludge comprises over about fifty percent (50%) of the solid material of the web.

29. The method of claim 22 wherein the retention and drainage agents comprise acrylamide modified cationic copolymer.

30. The method of claim 22 wherein the retention and drainage agents comprise anionic amorphous silica.

31. The method of claim 22 wherein the wire screen is a 14-mesh wire screen.

32. The method of claim 22 wherein the web is continuous to the extent that the web can be wound in a roll.

33. A method of manufacturing a continuous non-woven web, the method comprising:

(1) forming a mixture of cellulose fiber and untreated Clarifier Sludge;

(2) contacting the mixture of cellulose fiber and Clarifier Sludge in a papermaking system with a drainage and retention agent, the drainage and retention agent being capable of achieving, on a 14 mesh wire screen, a first pass retention of solids in the mixture of 90% or greater;

(3) obtaining a first pass retention of solids in the mixture of 90% or greater when the mixture is introduced onto a wire screen of the papermaking system to form the continuous web.

34. The method of claim 33, further comprising using as the drainage and retention agent a cationic polymer and an anionic micro-particle.

35. The method of claim 34, wherein the cationic polymer comprises an acrylamide modified cationic copolymer.

36. The method of claim 34, wherein the anionic micro-particle comprises anionic amorphous silica.

37. The method of claim 33, further comprising forming the web so that the web includes glass fiber.

38. The method of claim 33, further comprising forming the web so that the web includes recycled glass fiber.

39. The method of claim 33, wherein the cellulose fiber is recycled cellulose fiber.

40. The method of claim 33, wherein the Clarifier Sludge comprises between about 30% and about 55% solids.

41. The method of claim 33, further comprising adding the Clarifier Sludge to the paper making system in one of a waste paper disintegrator or a recycling apparatus.

42. The method of claim 33, further comprising adding the Clarifier Sludge to a broke pulper.

43. The method of claim 33, further comprising adding the Clarifier Sludge to a broke pulper filled with clarifier sludge and water to a consistency of about 3.5% solids.

44. The method of claim 33, wherein the Clarifier Sludge comprises over about fifty percent (50%) of the solid material of the web.

45. A web produced by the method of claim 33.

46. A web produced by the method of claim 34.

47. A web produced by the method of claim 35.

48. A web produced by the method of claim 36.

49. A web produced by the method of claim 40.

* * * * *